Patented Oct. 31, 1944

2,361,567

UNITED STATES PATENT OFFICE 2,361,567

AZO PIGMENT

William B. Reynolds, Chicago, Ill., assignor to Interchemical Corporation, New York, N. Y., a corporation of Ohio No Drawing. Application February 25, 1942, Serial No. 432,242

1 Claim. (Cl. 260—176)

This invention relates to a new insoluble deep yellow dyestuff, or pigment, which is obtainable by coupling tetrazotized 3,3'-dichlorbenzidine with aceto-acet-2-methyl-4-chlor-anilide, and which is especially useful in printing inks and printing emulsions.

Many insoluble dyestuffs, or pigments, have been made heretofore by coupling various azotized benzidines with aceto-acetarylamides, and these compounds are generally referred to as the "benzidine yellows or oranges" because of their characteristic yellow to orange colors. Although the known compounds are often used in various printing and dyeing operations in preference to other types of yellow dyestuffs (such as the Hansa yellows) because of their relatively superior solvent fastness and greater tinctorial strength, they are not used where it is important to maintain the particular shade of color over long periods of time in exposed places because of their notably poor lightfastness.

This invention provides a deep yellow pigment of the class of benzidine yellows which is distinguished from known pigments of the same class by its superior lightfastness and high coloring strength, or tinctorial power.

The pigment of this invention may be designated as the compound resulting from the coupling of tetrazotized 3,3'-dichlorbenzidine with aceto-acet-2-methyl-4-chlor-anilide, and has the following formula:

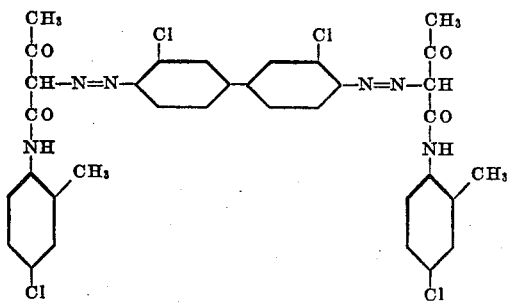

The pigment of this invention may be made in the usual manner from 3,3'-dichlorbenzidine and aceto-acet-2-methyl-4-chlor-anilide, and if the latter is not available it, in turn, may be made from aceto-acetic ester and the corresponding amine base. Other well known chemical reactions may be employed if desired. The following examples are, however, illustrations of one specific method of preparing the pigment.

Example 1

2.2 mols of ethyl aceto-acetate previously dried over anhydrous sodium sulfate and soda ash, and 325 parts by weight of anhydrous xylene were placed in a flask and heated to gentle reflux. Then 2 mols of 2-methyl-4-chlor-aniline were added to the xylene solution of the aceto-acetic ester over a period of about 45 minutes. The alcohol formed in the reaction was removed by distillation. By maintaining sufficient reflux the alcohol may be removed quantitatively as the reaction proceeds. After all of the amine was added the heating was continued for 15 to 20 minutes, or until the theoretical amount of alcohol had been distilled from the reaction mixture. On completion of the reaction the mixture was cooled and poured into 70 parts of 10 N hydrochloric acid containing 300 parts of ice, whereupon the aceto-acet-2-methyl-4-chlor-anilide was precipitated. After stirring for 15 minutes the anilide was separated by filtration and the cake pressed to remove as much as possible of the xylene and excess aceto-acetic ester. The crude anilide was then dissolved in 2500 parts of water containing 2 mols of caustic soda, clarified with 5 parts each of activated silica and activated carbon, and filtered. The filtrate was iced to about 5° C. and the anilide precipitated with hydrochloric acid, filtered, washed acid-free to Congo red and dried in a low temperature oven.

Example 2

The tetrazo compound was made in the following manner.

One mol of 3,3'-dichlorbenzidine was stirred into 2000 parts by weight of water and 5 mols of 10 N hydrochloric acid were added. The mixture was stirred for 2 hours and 5000 parts of ice were added, along with 20,000 parts of water. The resulting slurry was stirred until the temperature of the liquid dropped below 5° C. Then 2 mols of sodium nitrite, dissolved in 2000 parts of water, were added rapidly to the slurry. After stirring for 45 minutes, while maintaining an excess of sodium nitrite, the tetrazo solution was clarified with activated carbon and silica.

A coupling slurry of the anilide of Example 1 was prepared by dissolving 2.06 mols of the anilide in 7000 parts of water containing 2.1 mols of caustic soda and 1000 parts of ice. Then 6 mols of sodium acetate were added and the mixture stirred until complete solution was obtained. After clarifying, 2.1 mols of 2 N hydrochloric acid were slowly added, yielding a white slurry which was slightly acid to litmus.

The tetrazo compound was added to the coupling slurry over a period of about one hour, and the resulting pigment slurry was stirred for 4 hours to insure a light masstone. At the end of this time the pigment was filtered, washed free of chloride and dried.

This deep yellow pigment was compared with two well known products of similar chemical structure, namely, the dyestuffs resulting from coupling tetrazotized 3,3'-dichlorbenzidine with aceto-acet meta xylidide and aceto-aceto-o-toluidide, respectively. Both of these products have found wide commercial application. The pigment of this invention proved considerably stronger in color strength, or tinctorial value, than either of the above commercially known products, and it was more lightfast than the o-toluidide compound and equal in lightfastness to the meta xylidide compound. The new compound is particularly solvent-fast and non-bleeding in oils, so that it is especially suited for use as a pigment in color printing inks, textile printing emulsions and the like.

I claim:

A compound having the formula

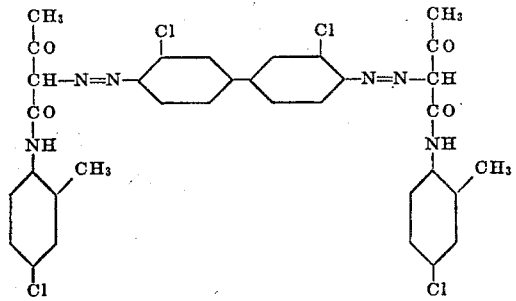

WILLIAM B. REYNOLDS.